United States Patent
Boileau

[15] 3,707,177
[45] Dec. 26, 1972

[54] TIRE TREAD WITH VARIABLE-WIDTH RECESSES

[72] Inventor: Jacques Boileau, Clermont-Ferrand, France

[73] Assignee: Compagnie Generale des Etablissements Michelin raison sociale Michelin & Cie, Clermont-Ferrand, Puy-de-Dome, France

[22] Filed: Jan. 19, 1971

[21] Appl. No.: 107,650

[30] Foreign Application Priority Data

Jan. 21, 1970 France.................................702204

[52] U.S. Cl..................................................152/209
[51] Int. Cl.................................................B60c 11/06
[58] Field of Search........................................152/209

[56] References Cited

UNITED STATES PATENTS 3,512,567  5/1970  Verdier...............................152/209
2,779,378  1/1957  Robertson...........................152/209

*Primary Examiner*—James B. Marbert
*Attorney*—Brumbaugh, Graves, Donohue & Raymond

[57] ABSTRACT

A pneumatic tire is provided with a tread whose recessed portions have a width that decreases from the surface of the tread towards the axis of the tire. The recessed portions have a greater variation of width as a function of depth at the edges than in the central part of the tread.

4 Claims, 6 Drawing Figures

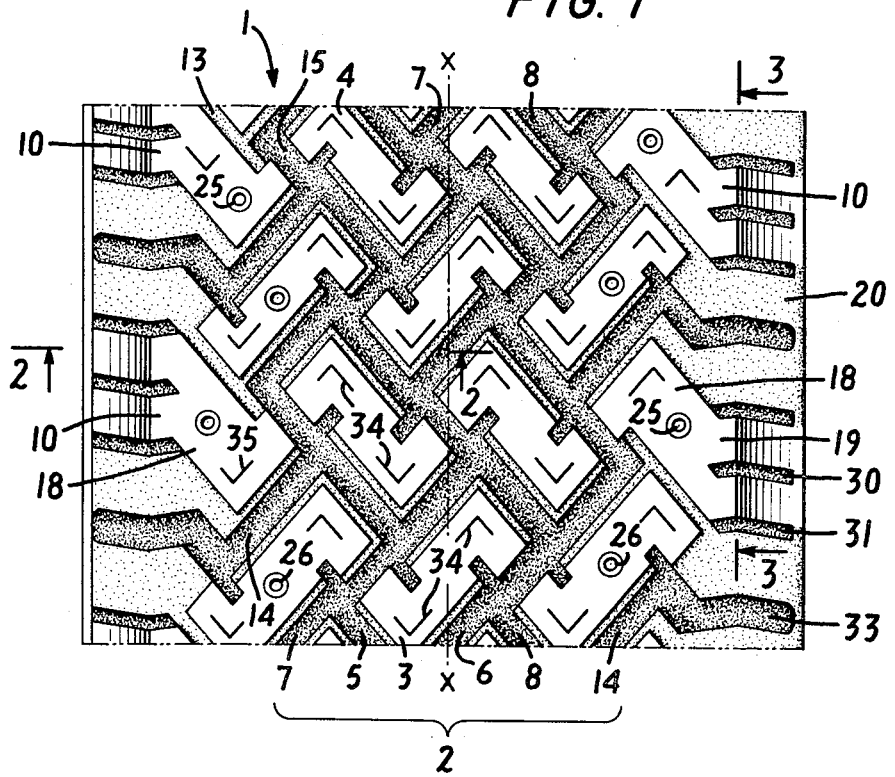
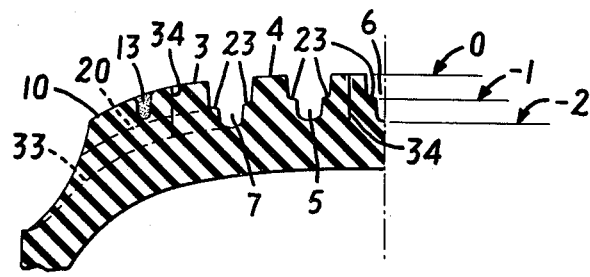
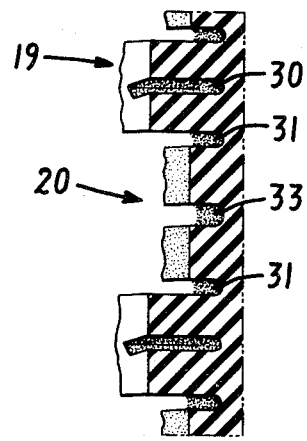

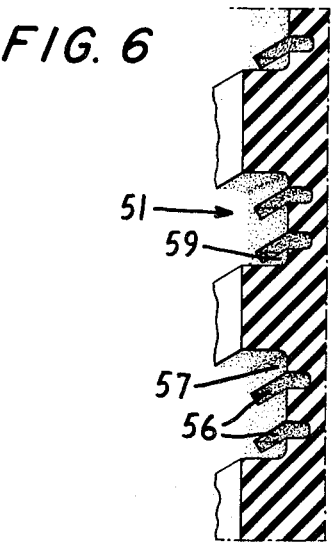
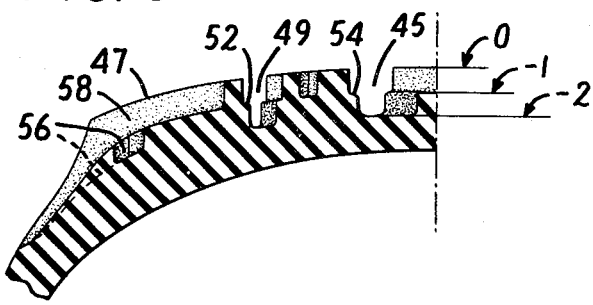
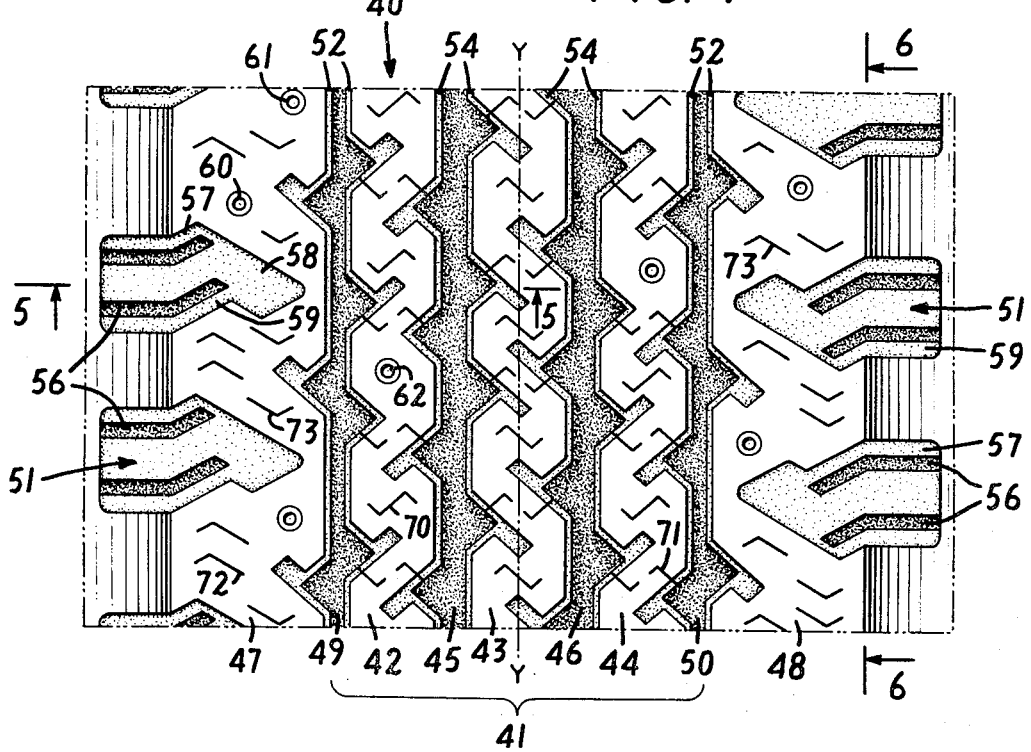

3,707,177

TIRE TREAD WITH VARIABLE-WIDTH RECESSES

BACKGROUND OF THE INVENTION

This invention relates to pneumatic tires and, more particularly, to novel and highly-effective treads for new or recapped tires, particularly tires of the radial type.

Treads have proportions of recessed areas as compared to the total tread area that depend on the use (winter or summer driving, for example) for which they are intended. Generally the proportion of recessed areas, hereinafter called the "cutout percentage," is about 40 percent for a winter tire but may be as low as about 25 percent for a summer tire in the case of automobile tires.

For various reasons, the cutout percentage in winter tires does not exceed about 40 percent, even through the adherence of a winter tire is related to a very high cutout percentage.

First, the use of very high cutout percentages leads to a reduction in the strength of the relief elements. Second, the higher the cutout percentage the more uncomfortable driving on roads that are free of snow or ice becomes, even to the point that it is necessary to change tires in order to travel on normal roads.

SUMMARY OF THE INVENTION

An object of the invention is to remedy the most serious shortcomings of conventional snow tires and, in particular, to provide a snow tire that has a very high cutout percentage but that can be driven comfortably in other than winter conditions, especially as the wear of the tire increases.

The foregoing and other objects are attained in accordance with the invention by the provision of a snow tire with a tread whose recessed portions have a width that decreases from the surface of the tread towards the axis of the tire. The tire is characterized in that the recessed portions have a greater variation of width as a function of depth at the edges than in the central part of the tread.

In one representative embodiment, the ratio of the widths of the recessed portions at the surface of the new tread and 2 mm from the bottom of the recesses is greater than 3 at the edges of the tread and is between 1 and 3 in the central portion of the tread. The side regions of the tread each occupy a width of about 1/5 to 1/6 of the total width of the tread, the central portion extending over the remaining 3/5 to ⅔ of the width.

As a result of this structure, one can employ on the surface of the tread of the new tire a cutout percentage equal to or greater than 40 percent but not exceeding 75 percent. Since the relief elements have a relatively wide base, they are less fragile, particularly at the edges, and have less of a tendency to squeal and to hammer the ground. Furthermore, the wear of the tread of the tire results in a reduction of the cutout percentage and a change of its characteristics towards those of a summer tire having a cutout percentage of close to 30 percent. The tire can thus be used in summer. In accordance with the invention, this reduction in the cutout percentage is greater in the side regions of the tread. The variation in width of the recessed portions can take place either continuously and progressively or, on the other hand, intermittently in individual steps. The inclination of the sidewalls of the recessed parts may be constant, or, on the contrary, it may vary locally.

In another embodiment of the invention, the recessed portions and the relief elements are of larger dimensions on the edges than at the center of the tread, which favors the adherence of the winter tire. Preferably, the recessed portions and the relief elements have a general orientation that is generally transverse at the edges and longitudinal or oblique (i.e., other than generally transverse) in the central portion of the tread.

BRIEF DESCRIPTION OF THE DRAWING

An understanding of other aspects of the invention can be gained from a consideration of the following detailed description of preferred embodiments thereof, in conjunction with the appended figures of the drawing, wherein:

FIG. 1 is a plan view of a sector of approximately 20° of a tread in accordance with the invention for a tire of size 165–380 or 6.50–15;

FIG. 2 is a view in meridian half section taken along the line 2—2 of FIG. 1 and looking in the direction of the arrows;

FIG. 3 is a view in section through an edge portion taken along the line 3—3 of FIG. 1, parallel to the longitudinal axis X—X and looking in the direction of the arrows;

FIG. 4 is a plan view of a sector of about 20° of another tread in accordance with the invention for a tire of size 195–355 or 7.75–14;

FIG. 5 is a view in meridian half section taken along the line 5—5 of FIG. 4 and looking in the direction of the arrows; and FIG. 6 is a view in section through an edge portion taken along the line 6—6 of FIG. 4, parallel to the longitudinal axis Y—Y and looking in the direction of the arrows.

DESCRIPTION OF THE PREFERRED EMBODIMENTS

FIG. 1 shows a portion of a tread 1 comprising in its central part 2 a plurality of isolated, oblique, right-sloping relief elements 3 inclined 40° towards the right and left-sloping relief elements 4 inclined 40° toward the left, the inclination of these elements being indicated with respect to the longitudinal axis X—X of the tread 1. The central relief elements 3 and 4 are separated from each other by recessed portions such as 5, 6, 7 and 8. Edge relief elements 10 are heavier than the central relief elements 3 and 4 and are separated from the central relief elements 3 and 4 by recessed portions 13, 14 and 15. Each edge relief element 10 is oriented in a generally transverse direction and has an oblique segment 18 and a transverse segment 19; they are separated from each other by recessed portions 20 oriented in a generally transverse direction.

FIG. 2, which is a meridian half section along the line 2—2 of the tread of the preceding figure, shows that the recessed portions 5, 6 and 7 (as well as 8 and 14, which are not shown) have a stepwise variation in width 23. The level 0 corresponds to the new tire, the level −1, which is intermediate the levels 0 and −2, corresponds to the steps 23; and the level −2 corresponds to the solid portion of the tread (total wear). The steps 23 impart to the relief elements 3 or 4 massive bases despite a cutout percentage of 64 percent at the level 0 (new tire) in the central region. In accordance with the invention, the ratio of the respective widths of the recessed portions 5, 6 and 7, shown in FIG. 2, and 8 and 14 (not shown in FIG. 2) at the surface of the tread (level 0) to the widths of the same recessed portions 2 mm from the bottom thereof is about 1.6. At the level −1, the ratio is lower, and the cutout percentage drops to about 48 percent.

FIG. 3 shows a partial cross-section along the line 3—3 parallel to the longitudinal axis X—X of the tread. The segments 19 of the relief elements 10 have at their center transverse slots 30 extending to the level −2. The relief portions 20 have two narrow transverse slots 31 and a wide central channel 33 also extending up to the level −2. However, these recessed portions 20 extend only to the level −1 aside from the slots 31 and 33.

The central channel 33 is in communication with the recessed portions of the central zone 2 of the tread 1 due to the recessed portions 14. In each edge region, the cutout percentage is 47 percent at level 0 and 16 percent at level −1. The ratio of the widths of the recessed portions 20 measured parallel to the straight line 3—3 at level 0 to the width of the same portions at 2 mm from the bottom of the recesses 31 and 33 is about 3.2. Moreover, the walls of the recesses have an inclination of 2° to 5°.

Cuts such as 34 and 35, the walls of which touch, are intended to make the ends of the relief elements 3, 4 and 10 flexible and extend to the level −2.

Thus, in accordance with the invention, the variation of the percentage of cutout between the levels 0 and −1, on the one hand, and 0 to −2, on the other hand, is much greater in the side regions.

As FIG. 1 shows, anti-skid studs 26 can be inserted in accordance with the invention in the relief elements 4 of the central region 2 of the tread in addition to the studs 25 located in the edge relief elements 10. This studding can extend without drawback to all the relief elements 3 and 4 of the central region 2.

In the embodiment of FIG. 4 the tread portion 40 has in the central region 41 three longitudinal ribs 42, 43 and 44. The equatorial rib 43 is spaced from the central ribs 42 and 44 by grooves 45 and 46; the central ribs 42 and 44 are spaced from the edge ribs 47 and 48 by grooves 49 and 50.

As shown in FIGS. 5 and 6, the variations in width of the recesses also take place in steps. As in the case of FIGS. 1, 2 and 3, the levels of the new tread and those of the recesses have been designated by 0, −1 and −2.

In this embodiment of the invention, the cutout percentage is 60 percent for the tread at level 0 and at level −1 40 percent for the central portion and 15 percent for the two edges of the tread.

The ratios of the widths of the recessed portions at level 0 to the widths thereof at 2 mm from the bottom of the recesses are 1.6 for the grooves 45 and 46, 2 for the grooves 49 and 50 and 5 for the slots 51 provided on the edges of the tread.

The grooves 49 and 50 have steps 52 at level −1. Similarly, the grooves 45 and 46 have steps 54 (FIGS. 4 and 5). The marginal grooves 51 are oriented transversely and have slots 56 that extend to level −2, while the steps 57, 58 and 59 are flush with the intermediate level −1.

The edge anti-skid studding at 60 and 61 is supplemented by a studding at 62 of the central ribs 42 and 44 having reinforced bases in accordance with the invention; it can be extended without drawback to the equatorial rib 43.

The flexing cuts such as 70, 71 in the ribs 42, 43 and 44 and such as 72 and 73 in the ribs 47 and 48 of the edges extend down to level −2 of the tread.

Many other embodiments of the invention will readily occur to those skilled in the art upon reading this disclosure. For example, one can, without exceeding the scope of the invention, replace recesses whose width varies discontinuously by recesses whose width varies continuously as a function of depth. Moreover, in the case of discontinuous variation, the change in width can take place in any number of steps and can be different from one region of the tread to another. Accordingly, the invention is to be construed as including all the embodiments thereof within the scope of the appended claims.

I claim:

1. A pneumatic tire initially suitable for use as a snow tire and, as it wears, for use as a summer tire, said tire comprising a tread, said tread having distributed thereover relief elements defining recesses, the bottoms of said recesses having substantially the same width in all portions of said tread, and the tops of said recesses having substantially greater width near the edges of said tread than in the center of said tread, whereby the decrease in groove width at the tread surface as said tread wears is not uniform over the area of said tread but substantially greater near the edges of said tread than in the center of said tread.

2. A tire according to claim 1 wherein the ratio of the width of said recesses at the tread surface when new to the width of said recesses 2 mm from the bottom thereof exceeds 3 at the edges of the tread and is within the range of 1 to 3 in the central portion of the tread.

3. A tire according to claim 1 wherein the tread when new has a cutout percentage at the surface thereof within the range of 40 to 75 percent, said cutout percentage decreasing to about 30 percent as the tread wears.

4. A tire according to claim 1 wherein said relief elements and said recesses have a generally transverse orientation at said edges and an orientation other than generally transverse in said central portion.

* * * * *